March 10, 1964
A. C. SAMPIETRO ETAL
3,124,734
CIRCUITRY FOR OPERATING A MULTI-PHASE
ALTERNATING CURRENT MOTOR
Filed June 9, 1960
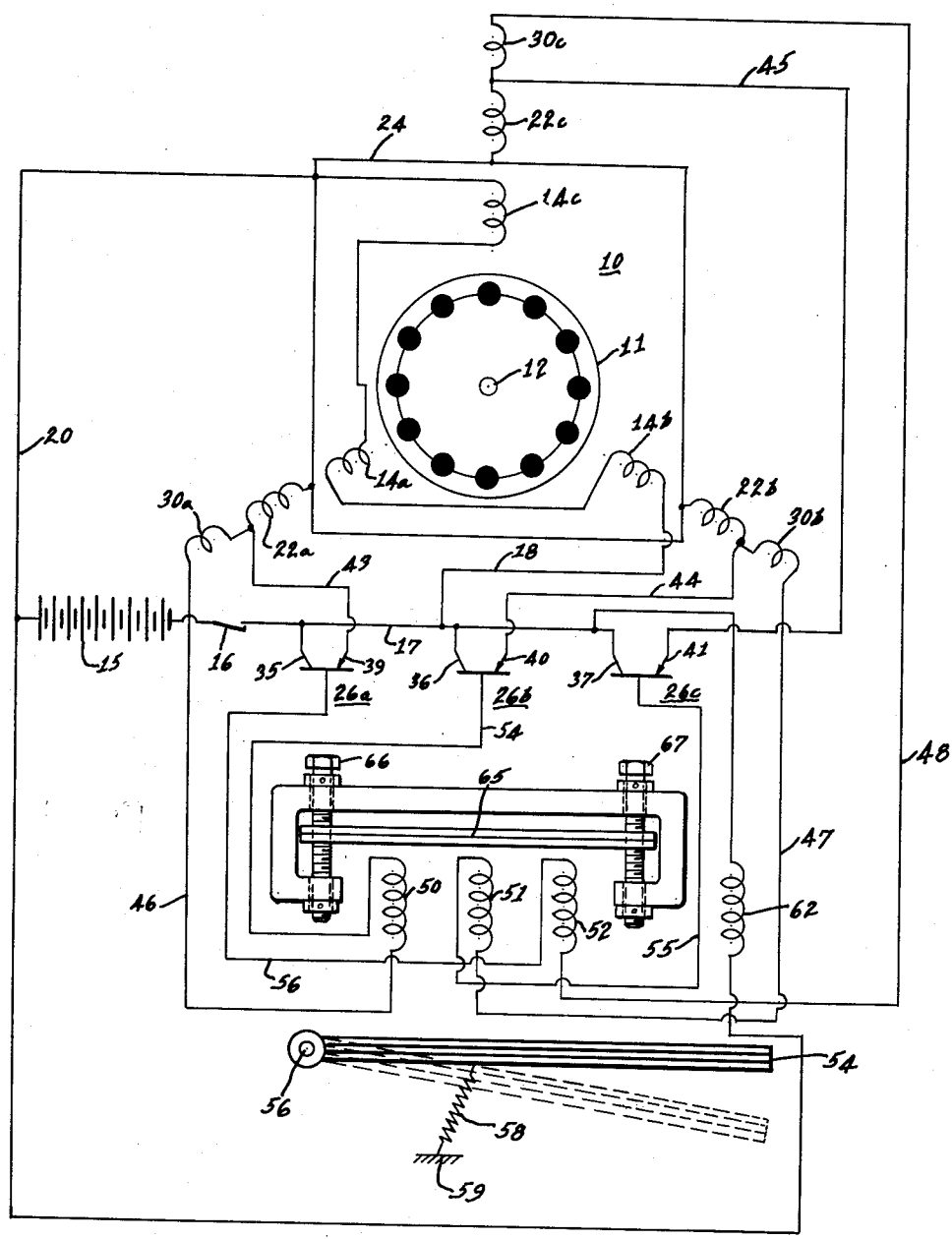
INVENTORS
Achilles C. Sampietro
BY John D. Grigsby
Attys.

United States Patent Office 3,124,734
Patented Mar. 10, 1964

3,124,734
CIRCUITRY FOR OPERATING A MULTI-PHASE ALTERNATING CURRENT MOTOR
Achilles C. Sampietro, Birmingham, Mich., and John D. Grigsby, Willoughby, Ohio, assignors to Thompson Ramo Wooldridge Inc., Cleveland, Ohio, a corporation of Ohio
Filed June 9, 1960, Ser. No. 35,053
14 Claims. (Cl. 318—138)

This invention relates to apparatus for operating alternating current motors from a unidirectional voltage source, and particularly to multi-phase operation of electric motors from a unidirectional voltage source.

The present application is particularly concerned with the provision of a multi-phase alternating current motor which may provide a relatively large power output when operated from a battery source. One application of the motor of the present invention is in driving the fuel pump of a high horse power engine for military tanks.

It is an important object of the present invention to provide means for operating a multi-phase alternating current motor from a unidirectional voltage source.

Another object of the present invention is to provide a battery operated motor of relatively high power output and efficiency.

Another object of the invention is to provide novel means for controlling the starting of a multi-phase alternating current motor and for adjusting the operating conditions of such a motor when energized from a unidirectional voltage source.

It is a further object of the invention to provide a multi-phase alternating current motor which may be driven from a battery or other unidirectional source but which utilizes a conventional rotor construction and which is simple and inexpensive to manufacture and yet is reliable and efficient in operation.

Other objects, features and advantages of the present invention will be more fully apparent to those skilled in the art from the following detailed description taken in connection with the accompanying drawings in which:

The single figure is a diagrammatic illustration of a three phase alternating current motor in accordance with the present invention.

The drawing illustrates a preferred embodiment of the present invention wherein an alternating current motor 10 has a rotor 11 which may be of a conventional construction and rotatable on a central longitudinal axis such as indicated diagrammatically at 12. The rotor is preferably of the induction type, for example a squirrel cage type rotor.

The stator assembly of the machine comprises a first series of direct current exciting windings 14a, 14b and 14c which may be arranged in a conventional three-phase winding pattern and successively displaced by 120°. A unidirectional voltage source is indicated at 15 which is adapted to be directly connected in series with the windings 14a, 14b and 14c upon closure of switch 16, the series circuit including conductors 17, 18 and 20. When switch 16 is closed, the windings 14a, 14b and 14c may each provide a magnetomotive force of $+NI$ preferably obtained by the use of a large number of turns N for each winding and a small current I through the winding. A second series of windings 22a, 22b and 22c are each connected at one end to line 20 by means of conductors represented by line 24 and are connected to the line 17 under the control of respective transistors 26a, 26b and 26c. The windings 22a, 22b and 22c may, for example, have the same number of turns as the windings 14a, 14b and 14c but may produce a flux which is opposite to that of windings 14a, 14b and 14c and which pulsates between zero and $-2NI$ so as to produce a net flux at the rotor 11 which varies from a value $+\phi$ corresponding to a net magnetomotive force of $+NI$ and a net flux $-\phi$ of equal magnitude but opposite direction to the net flux $+\phi$ and corresponding to a net magnetomotive force at the rotor 11 of $-NI$. This condition is produced if the current flow through each of the windings 22a, 22b and 22c is approximately $-2I$, where I is the current flow through windings 14a, 14b and 14c. By suitable sequencing of conducting states of transistors 26a, 26b and 26c, the alternating fluxes associated with each phase may be 120° apart to provide a rotating field for effectively driving the rotor 11.

In the illustrated embodiment, a series of control windings 30a, 30b and 30c have been provided associated with the respective phases of the stator assembly and inductively coupled with the other windings of the respective phases. The proper sequencing to obtain a rotating field is achieved by coupling the control winding 30a to transistor 26b, by coupling control winding 30b with the control electrode of transistor 26c and by coupling the control winding 30c with transistor 26a.

It will be observed that the negative side of the battery 15 is connected with the collector electrodes 35, 36 and 37 of transistors 26a, 26b, and 26c so that the transistors are P-N-P transistors. N-P-N transistors could also be used simply by reversing the polarity of the battery 15. Emitter electrodes 39, 40 and 41 of the transistors are connected between the respective windings 22a and 30a, 22b and 30b, and 22c and 30c by conductors 43, 44 and 45, respectively, while the other terminals of windings 30a, 30b and 30c are connected through respective conductors 46, 47 and 48 and variable impedance inductance elements 50, 51 and 52 to base leads 54, 55 and 56, respectively, of the transistors. A core 54 is pivotal about a shaft 56 and is urged in the clockwise direction by means of a tension spring 58 secured to a fixed point 59. When the switch 16 is first closed, the core 54 will be in its inclined disposition as shown in dotted outline so that the impedances of inductance elements 50, 51 and 52 will be unequal. However as current builds up in solenoid 62 which is connected between lines 17 and 20, armature 54 is lifted to a parallel position where the impedances of elements 50, 51 and 52 will be equal.

A second core part 65 may also control the impedances of elements 50, 51 and 52 and core part 65 may be movable by screw means 66 and 67 so as to simultaneously adjust the impedance of each of the elements 50, 51 and 52 by equal increments to vary the natural frequency of the respective control circuits and of the pulsating currents through the respective control windings 30a, 30b and 30c.

In operation, when the switch 16 is first closed, approximately equal magnetomotive forces will be applied to the windings 14a, 14b and 14c. However, because of the inclined disposition of the armature 54, current will build up in one of the control windings more rapidly than in the other control windings and will produce an initial pulse for switching the associated transistor to its conducting state, whereupon current will build up in the associated stator winding causing a flux reversal in the next control winding to trigger the next transistor, and so forth.

When solenoid 62 is sufficiently energized to draw armature 54 to a parallel position, the transistors are switched at intervals determined by the adjustment of the armature 65 to provide the desired speed of rotation of the rotor member 11.

After each pulse from a control winding, the triggered transistor returns to its non-conducting state in accordance with the time constants of the circuit as determined by the variable impedance means 50, 51, and 52. Thus, because of the opposing action and relative strengths of the magnetic fields produced by the direct current windings 14a, 14b and 14c and pulsating windings 22a, 22b and 22c, effectively an alternating current field is produced at each phase position and the respective phases are properly offset to provide the desired rotating field pattern.

It will be apparent that many modifications and variations may be effected without departing from the scope of the novel concepts of the present invention.

We claim as our invention:

1. An electric motor system, comprising a rotor, stator means having a number of phase positions and operatively associated with said rotor, said stator means comprising a series of first winding means and a series of second winding means at the respective phase positions and coupled with said rotor, means for supplying a steady direct current to each of said first winding means to generate respective first steady magnetic fields at the respective phase positions, a series of trigger means each controlling current flow to one of said second winding means and having a conducting and a non-conducting state, and means for cyclically and successively activating said trigger means to supply out of phase pulsating direct currents to the respective second winding means of amplitude and polarity to produce a resultant multi-phase alternating magnetic field pattern for driving said rotor, said actuating means for said trigger means comprising a series of control windings associated with the respective phase positions and coupled to the trigger means of the succeeding phase position for actuating the succeeding trigger means in response to the wave form of the resultant magnetic field at the preceding phase position.

2. An electric motor system, comprising a rotor, stator means having a number of phase positions and operatively associated with said rotor, said stator means comprising a series of first winding means and a series of second winding means at the respective phase positions and coupled with said rotor, means for supplying a steady direct current to each of said first winding means to generate respective first steady magnetic fields at the respective phase positions, a series of trigger means each controlling current flow to one of said second winding means and having a conducting and a non-conducting state, means for cyclically and successively activating said trigger means to supply out of phase pulsating direct currents to the respective second winding means of amplitude and polarity to produce a resultant multi-phase alternating magnetic field pattern for driving said rotor, timing means controlling the interval between actuations of the successive trigger means, and means for initially unbalancing the timing means for the respective trigger means to provide for starting of the sequential actuation of said trigger means.

3. An electric motor system comprising a rotor, multi-phase stator means for driving said rotor means, means for supplying fluctuating electrical energy of predetermined waveform to each phase of the stator means for energizing said stator means to drive said rotor, said supplying means comprising trigger means associated with each of the phases of the stator means and having a conducting and a non-conducting condition, and control winding means coupled to each phase of the stator means and responsive to a predetermined point in the waveform of said phase to trigger the trigger means associated with the next phase and thereby cyclically sequence the delivery of electrical energy to the phases of said stator means.

4. An electrical motor system comprising a rotor, multi-phase stator means for driving said rotor means, means for supplying fluctuating electrical energy of predetermined waveform to each phase of the stator means for energizing said stator means to drive said rotor, said supplying means comprising trigger means associated with each of the phases of the stator means and having a conducting and a non-conducting condition, control winding means coupled to each phase of the stator means and responsive to a predetermined point in the waveform of said phase to trigger the trigger means associated with the next phase and thereby cyclically sequence the delivery of electrical energy to the phases of said stator means, and means for adjusting the time interval between triggering of the successive trigger means.

5. An electric motor system comprising rotor means, multi-phase stator means for driving said rotor means, means for supplying fluctuating electrical energy of predetermined waveform to each phase of the stator means for energizing said stator means to drive said rotor means, said supplying means comprising trigger means associated with each of the phases of the stator means and having a conducting and a non-conducting condition, control winding means coupled to each phase of the stator means and responsive to a predetermined point in the waveform of said phase to trigger the trigger means associated with the next phase and thereby cyclically sequence the delivery of electrical energy to the phases of said stator means, timing means controlling the interval between triggering of the successive trigger means, and means for initially unbalancing the timing means to provide for starting of the sequential triggering of said trigger means.

6. An electric energizing system comprising a series of first windings physically displaced from each other to define successive phase positions, a series of second windings each associated with one of said first windings at one of said phase positions, means for energizing said first windings to produce first steady magnetic fields at the respective phase positions, means comprising a series of trigger devices each having a conductive and a non-conductive condition controlling energization of the respective second windings, means for connecting a steady unidirectional voltage to each of said second windings under the control of the corresponding trigger device, and a series of control winding means each coupled to the first and second windings of one phase position for generating a trigger voltage at a predetermined point in the waveform of the associated resultant field, and means for applying the trigger voltage at each phase position to the trigger device of the next phase position to actuate said trigger devices in sequence and thereby generate a multi-phase alternating magnetic field.

7. An electric energizing system comprising a series of first windings physically displaced from each other to define successive phase positions, a series of second windings each associated with one of said first windings at one of said phase positions, means for energizing said first windings to produce first steady magnetic fields at the respective phase positions, means comprising a series of trigger devices each having a conductive and a non-conductive condition controlling energization of the respective second windings, means for connecting a steady unidirectional voltage to each of said second windings under the control of the corresponding trigger device, a series of control winding means each coupled to the first and second windings of one phase position for generating a trigger voltage at a predetermined point in the waveform of the associated resultant field, means for applying the trigger voltage at each phase position to the trigger device of the next phase position to actuate said trigger devices in sequence and thereby generate a multi-phase alternating magnetic field, and inductance means interposed between each control winding means and the trigger device actuated thereby for timing the triggering of the successive trigger devices.

8. An electric energizing system comprising a series of first windings physically displaced from each other to define successive phase positions, a series of second windings each associated with one of said first windings at one of said phase positions, means for energizing said first windings to produce first steady magnetic fields at the respective phase positions, means comprising a series of trigger devices each having a conductive and a non-conductive condition controlling energization of the respective second windings, means for connecting a steady unidirectional voltage to each of said second windings under the control of the corresponding trigger device, a series of control winding means each coupled to the first and second windings of one phase position for generating a trigger voltage at a predetermined point in the waveform of the associated resultant field, means for applying the trigger voltage at each phase position to the trigger device of the next phase position to actuate said trigger devices in sequence and thereby generate a multi-phase alternating magnetic field, inductance means interposed between each control winding means and the trigger device actuated thereby for timing the triggering of the successive trigger devices, and common armature means operatively associated with all of the inductance means for simultaneously varying the impedance of all of said inductance means.

9. An electric energizing system comprising a series of first windings physically displaced from each other to define successive phase positions, a series of second windings each associated with one of said first windings at one of said phase positions, means for energizing said first windings to produce first steady magnetic fields at the respective phase positions, means comprising a series of trigger devices each having a conductive and a non-conductive condition controlling energization of the respective second windings, means for connecting a steady unidirectional voltage to each of said second windings under the control of the corresponding trigger device, a series of control winding means each coupled to the first and second windings of one phase position for generating a trigger voltage at a predetermined point in the waveform of the associated resultant field, means for applying the trigger voltage at each phase position to the trigger device of the next phase position to actuate said trigger devices in sequence and thereby generate a multi-phase alternating magnetic field, inductance means interposed between each control winding means and the trigger device actuated thereby for timing the triggering of the successive trigger devices, common armature means operatively associated with all of the inductance means for simultaneously varying the impedance of all of said inductance means, and means mounting said armature means for movement from an initial position unbalancing the impedance of the respective inductance means to an operative position providing substantially balanced impedances of the inductance means.

10. An electric energizing system comprising a series of first windings physically displaced from each other to define successive phase positions, a series of second windings each associated with one of said first windings at one of said phase positions, means for energizing said first windings to produce first steady magnetic fields at the respective phase positions, means comprising a series of trigger devices each having a conductive and a non-conductive condition controlling energization of the respective second windings, means for connecting a steady unidirectional voltage to each of said second windings under the control of the corresponding trigger device, a series of control winding means each coupled to the first and second windings of one phase position for generating a trigger voltage at a predetermined point in the waveform of the associated resultant field, means for applying the trigger voltage at each phase position to the trigger device of the next phase position to actuate said trigger devices in sequence and thereby generate a multi-phase alternating magnetic field, inductance means interposed between each control winding means and the trigger device actuated thereby for timing the triggering of the successive trigger devices, common armature means operatively associated with all of the inductance means for simultaneously varying the impedance of all of said inductance means, means mounting said armature means for movement from an initial position unbalancing the impedance of the respective inductance means to an operative position providing substantially balanced impedances of the inductance means, and means for moving said armature means from said initial position to said operative position a predetermined time after energization of said system.

11. An electric motor system comprising a rotor, a stator having multi-phase windings mounted thereon, a trigger circuit connected to each of said phase windings for supplying fluctuating electrical energy to said phase windings, a control winding for each of said phase windings and inductively coupled with one of said phase windings and connected to trigger the trigger circuit associated with the next succeeding one of said phase windings, a unidirectional voltage source connected to supply energy to said trigger circuits, and means for initially varying the time between the triggering of said trigger circuits in order to provide a proper triggering sequence of said trigger circuits.

12. An electric motor system comprising a rotor, a stator mounted adjacent to said rotor, a plurality of field windings mounted on said stator, a plurality of trigger circuits respectively connected to supply fluctuating electrical energy to said field windings, a control winding for each of said field windings and inductively coupled with one of said field windings and connected to trigger the trigger circuit associated with the next successive field winding, a unidirectional voltage source connected to said trigger circuit, and means energized by said unidirectional voltage source for initially varying the reactance of each of said trigger circuits in order to unbalance the time between the triggering of said plurality of trigger circuits.

13. An electric motor system comprising a rotor, a stator having a plurality of poles mounted adjacent to said rotor, a field winding for each of said poles and inductively coupled therewith, a trigger circuit for each of said poles and connected to supply fluctuating electrical energy respectively to each of said field windings, a control winding for each of said poles and inductively coupled respectively with said field windings, each of said control windings being connected to trigger the trigger circuit for the field winding of the next succeeding pole, a unidirectional voltage source connected to supply energy to said field windings through said trigger circuits, and variable reactance means connected to said trigger circuits and operative to initially vary the time between the triggering of said trigger circuits, said variable reactance means being connected to be energized by said unidirectional voltage source.

14. An electric system comprising:
(a) a motor having a movable member, a stator mounted adjacent to said movable member, and field winding means inductively coupled with said stator;
(b) trigger circuit means connected to said field winding means and operative when triggered to supply fluctuating electrical energy thereto;
(c) a unidirectional voltage source connected to said trigger circuit to supply energy;
(d) electrical impedance means; and
(e) control winding means having an end connected directly to said field winding and inductively coupled with said field winding and further connected at the opposite end through said impedance means to said trigger circuit means to trigger the same.

References Cited in the file of this patent
UNITED STATES PATENTS

| | | |
|---|---|---|
| 2,968,755 | Bakerman | Jan. 17, 1961 |
| 2,995,690 | Lemon | Aug. 8, 1961 |
| 3,083,326 | Deming et al. | Mar. 26, 1963 |